(12) United States Patent
Beeler et al.

(10) Patent No.: US 11,393,107 B2
(45) Date of Patent: Jul. 19, 2022

(54) JAW TRACKING WITHOUT MARKERS FOR FACIAL PERFORMANCE CAPTURE

(71) Applicants: Disney Enterprises, Inc., Burbank, CA (US); ETH Zürich (Eidgenössische Technische Hochschule Zürich), Zürich (CH)

(72) Inventors: Dominik Thabo Beeler, Zürich (CH); Derek Edward Bradley, Zürich (CH); Gaspard Zoss, Zürich (CH)

(73) Assignees: Disney Enterprises, Inc., Burbank, CA (US); ETH Zürich (Eidgenössische Technische Hochschule Zürich), Zurich (CH)

(*) Notice: Subject to any disclaimer, the term of this patent is extended or adjusted under 35 U.S.C. 154(b) by 404 days.

(21) Appl. No.: 16/510,698

(22) Filed: Jul. 12, 2019

(65) Prior Publication Data
US 2021/0012512 A1    Jan. 14, 2021

(51) Int. Cl.
 G06T 7/246 (2017.01)
 G06T 7/73 (2017.01)
 G06T 7/33 (2017.01)

(52) U.S. Cl.
CPC ............ G06T 7/251 (2017.01); G06T 7/246 (2017.01); G06T 7/33 (2017.01); G06T 7/75 (2017.01); G06T 2207/20081 (2013.01); G06T 2207/30036 (2013.01); G06T 2207/30088 (2013.01); G06T 2207/30201 (2013.01)

(58) Field of Classification Search
CPC .......... G06T 7/246; G06T 7/251; G06T 7/70; G06T 7/73; G06T 7/75; G06T 2207/30201; G06T 2207/30036; G06T 2207/30088; G06T 7/33; G06T 2207/20081; G06T 13/40; G06T 17/00; G06T 7/20–292; G06K 9/00221; G06K 9/00268; G06K 9/00281; G06K 9/00335; A61B 5/4542; A61B 5/1127; A61B 5/1128
USPC ......................................................... 382/103
See application file for complete search history.

(56) References Cited

U.S. PATENT DOCUMENTS

2019/0090784 A1* 3/2019 Chang ...................... A61C 7/00

OTHER PUBLICATIONS

Wilson, Arran, et al. "Comparison of jaw tracking by single video camera with 3D electromagnetic system." Journal of Food Engineering 190 (2016): 22-33. (Year: 2016).*

(Continued)

*Primary Examiner* — Geoffrey E Summers
(74) *Attorney, Agent, or Firm* — Sheppard Mullin Richter & Hampton LLP

(57) ABSTRACT

Some implementations of the disclosure are directed to capturing facial training data for one or more subjects, the captured facial training data including each of the one or more subject's facial skin geometry tracked over a plurality of times and the subject's corresponding jaw poses for each of those plurality of times; and using the captured facial training data to create a model that provides a mapping from skin motion to jaw motion. Additional implementations of the disclosure are directed to determining a facial skin geometry of a subject; using a model that provides a mapping from skin motion to jaw motion to predict a motion of the subject's jaw from a rest pose given the facial skin geometry; and determining a jaw pose of the subject using the predicted motion of the subject's jaw.

18 Claims, 12 Drawing Sheets

(56) References Cited

OTHER PUBLICATIONS

Anonymous, "Accurate Markerless Jaw Tracking for Facial Performance Capture," Association for Computing Machinery, Jan. 2019, pp. 1-8, vol. 1, No. 1. (Year: 2019).*

Tanaka, Yuto, et al. "Markerless three-dimensional tracking of masticatory movement." Journal of biomechanics 49.3 (2016): 442-449. (Year: 2016).*

Furtado, Daniel Antônio, et al. "A specialized motion capture system for real-time analysis of mandibular movements using infrared cameras." Biomedical engineering online 12.1 (2013): 1-16. (Year: 2013).*

Wang, Yu-Tsai, et al. "Estimating Mandibular Motion Based on Chin Surface Targets During Speech." Journal of Speech, Language, and Hearing Research 50 (2007): 928-939. (Year: 2007).*

Gerstner, Geoffrey E., Carmen Lafia, and Dennis Lin. "Predicting masticatory jaw movements from chin movements using multivariate linear methods." Journal of biomechanics 38.10 (2005): 1991-1999. (Year: 2005).*

Bandini, Andrea, Aravind Namasivayam, and Yana Yunusova. "Video-Based Tracking of Jaw Movements During Speech: Preliminary Results and Future Directions." INTERSPEECH. 2017. (Year: 2017).*

Soboleva, Una, Lija Laurina, and Anda Slaidina. "Jaw tracking devices—historical review of methods development. Part I." Stomatologija 7.3 (2005): 67-71. (Year: 2005).*

Soboleva, Una, Lija Laurina, and Anda Slaidina. "Jaw tracking devices-historical review of methods development. Part II." Stomatologija 7.3 (2005): 72-76. (Year: 2005).*

Li, Richard, and Gabriel Reyes. "Buccal: low-cost cheek sensing for inferring continuous jaw motion in mobile virtual reality." Proceedings of the 2018 ACM International Symposium on Wearable Computers. 2018. (Year: 2018).*

Anonymous, "Accurate Markerless Jaw Tracking for Facial Performance Capture," Association for Computing Machinery, Jan. 2019, pp. 1-8, vol. 1, No. 1.

* cited by examiner

300

```
┌─────────────────────────────────────────────────────────────────────┐
│ Capture facial training data for one or more subjects, the captured facial training │
│ data including the subject's facial skin geometry over a plurality of times and the │
│     subject's corresponding jaw poses for each of those plurality of times         │
│                                    310                                              │
└─────────────────────────────────────────────────────────────────────┘
                                    │
                                    ▼
                           Facial training
                              data 101

┌─────────────────────────────────────────────────────────────────────┐
│  Use captured facial training data to train a model that provides a mapping from skin │
│                            motion to jaw motion                                     │
│                                    320                                              │
└─────────────────────────────────────────────────────────────────────┘
                                    │
                                    ▼
                              Prediction
                              model 102

┌─────────────────────────────────────────────────────────────────────┐
│ Use created model to predict jaw poses for subject over a plurality of times using as │
│  an input the subject's corresponding facial skin geometry for those plurality of times │
│                                    330                                              │
└─────────────────────────────────────────────────────────────────────┘
```

FIG. 2

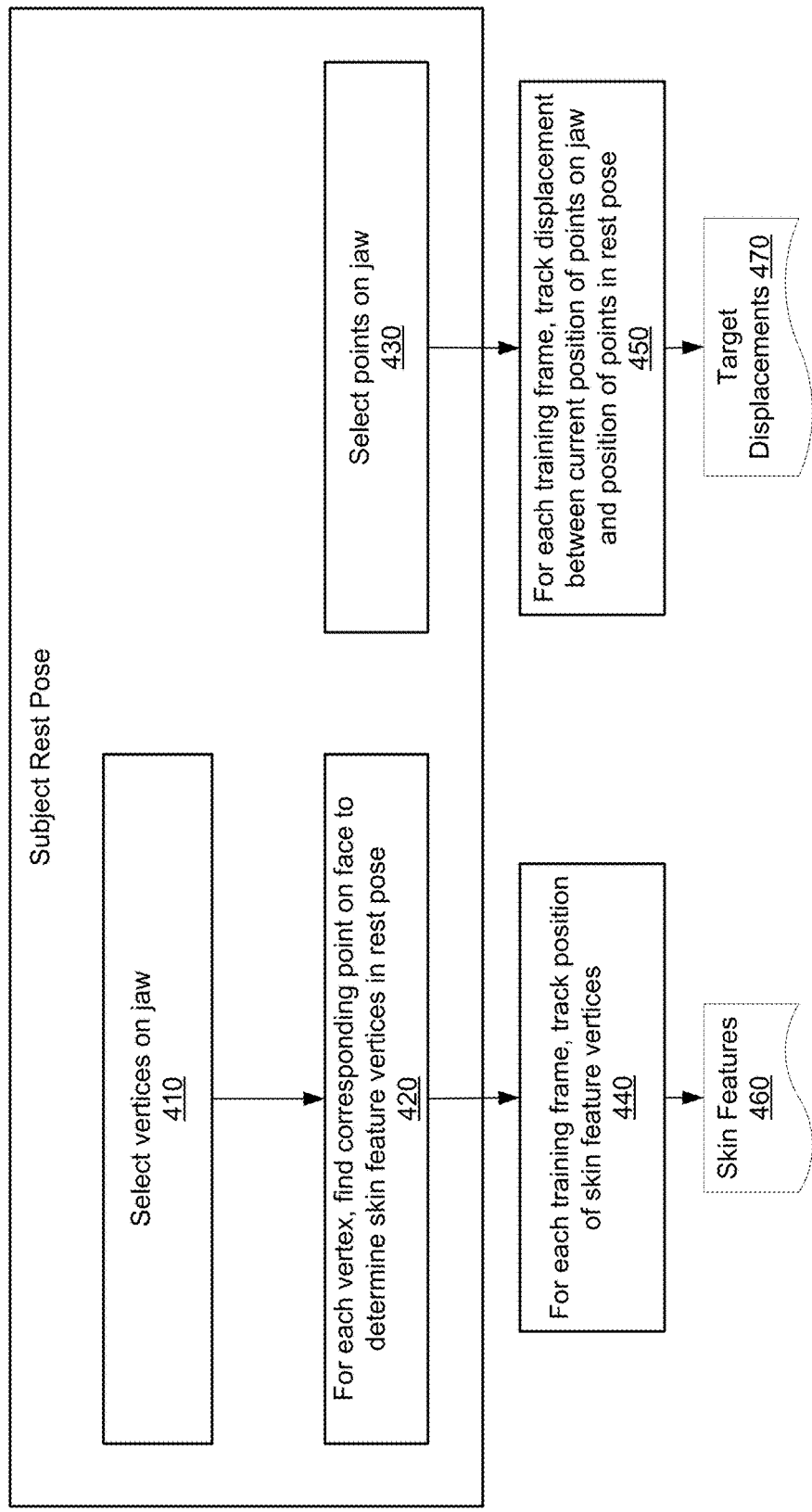

JAW TRACKING WITHOUT MARKERS FOR FACIAL PERFORMANCE CAPTURE

BRIEF SUMMARY OF THE DISCLOSURE

Implementations of the disclosure describe systems and methods for training and using a model to accurately track the jaw of a subject during facial performance capture based on the facial skin motion of the subject.

In one embodiment, a method comprises: capturing facial training data for one or more subjects, the captured facial training data including each of the one or more subject's facial skin geometry tracked over a plurality of times and the subject's corresponding jaw poses for each of those plurality of times; and using the captured facial training data to create a model that provides a mapping from skin motion to jaw motion. The mapping may be from a set of skin features that define the skin motion to a set of jaw features that define the jaw motion. In particular implementations, the jaw features are displacements of jaw points.

In some implementations, the facial training data is captured for a plurality of subjects over a plurality of facial expressions. In some implementations, using the captured facial training data to create a model that provides a mapping from the set of skin features that define the skin motion to the set of jaw features that define the jaw motion, comprises: for a first of the plurality of subjects, using the first subject's facial skin geometry captured over a plurality of times and the first subject's corresponding jaw poses for each of those plurality of times to learn a first mapping from a set of skin features to a set of jaw features; using the first mapping to align facial skin geometry of the other plurality of subjects with facial skin geometry of the first subject; and learning a second mapping from a set of skin features to a set of jaw features, using the first subject's facial skin geometry, the other subject's aligned facial skin geometry, and the each of the plurality of subject's corresponding jaw poses.

In some implementations, using the captured facial training data to create the model, comprises for at least one of the one or more subjects: selecting points on the subject's jaw while the subject is in a rest pose; for each of the selected points, finding a corresponding point on the face to determine skin feature points in the rest pose; and for each of a plurality of frames: tracking a position of the skin feature points to derive skin features; and tracking a displacement between a current position of the selected points on the subject's jaw and a position of the selected points on the subject's jaw in the rest pose to derive target displacements of the jaw.

In some implementations, using the captured facial training data to create the model, comprises training a regression from the set of skin features to the set of jaw features. In some implementations, training the regression comprises training a regressor for each of the selected points on the subject's jaw to independently predict a displacement of each of the selected points of the jaw.

In some implementations, the method further comprises: using the created model to predict a jaw pose of a subject for a time using as an input the subject's corresponding facial skin geometry for the time. The subject for which the jaw pose is predicted may be one of the one or more subjects for which the facial training data is captured. Alternatively, the subject for which the jaw pose is predicted may be a new subject different from the one or more subjects for which the facial training data is captured.

In some implementations, the method further comprises: capturing a plurality of calibration poses for the new subject; extracting calibration skin features and corresponding calibration bone features from each of the plurality of captured calibration poses; and sing at least the extracted calibration skin features and corresponding calibration bone features, determining a transformation of skin features of the new subject to align with a feature space the mapping.

In some implementations, using the created model to predict a jaw pose of a subject for a time using as an input the subject's corresponding facial skin geometry for the time, comprises: determining skin motion relative to a skull of the subject; using the created model to predict jaw motion of the subject; and predicting the jaw pose from the predicted jaw motion.

In one embodiment, a method comprises: determining a facial skin geometry of a subject; using a model that provides a mapping from skin motion to jaw motion to predict a motion of the subject's jaw from a rest pose given the facial skin geometry; and determining a jaw pose of the subject using the predicted motion of the subject's jaw.

In some implementations, the mapping is from a set of skin features that define the skin motion to a set of jaw features that define the jaw motion. In some implementations, the method further comprises: extracting skin features from the determined facial skin geometry of the subject; and prior to predicting the motion of the subject's jaw, transforming the extracted skin features of the subject to align with a feature space of the mapping, wherein the mapping is created using facial skin features of another subject.

In some implementations, the set of jaw features are displacements of jaw points, wherein using the model to predict the jaw motion comprises: predicting displacements between current positions of points on the subject's jaw and a position of points of the subject's jaw in the rest pose given a position of facial skin features determined from the facial skin geometry; and wherein determining the jaw pose of the subject comprises fitting the subject's jaw using the predicted displacements.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 2 is an operational flow diagram illustrating an example method that may be implemented in the environment of FIG. 1 in accordance with implementations of the disclosure.

FIG. 4 is an operational flow diagram illustrating an example method of extracting, from training data, skin features and target displacements of the jaw bone, in accordance with implementations of the disclosure.

Figure 1:
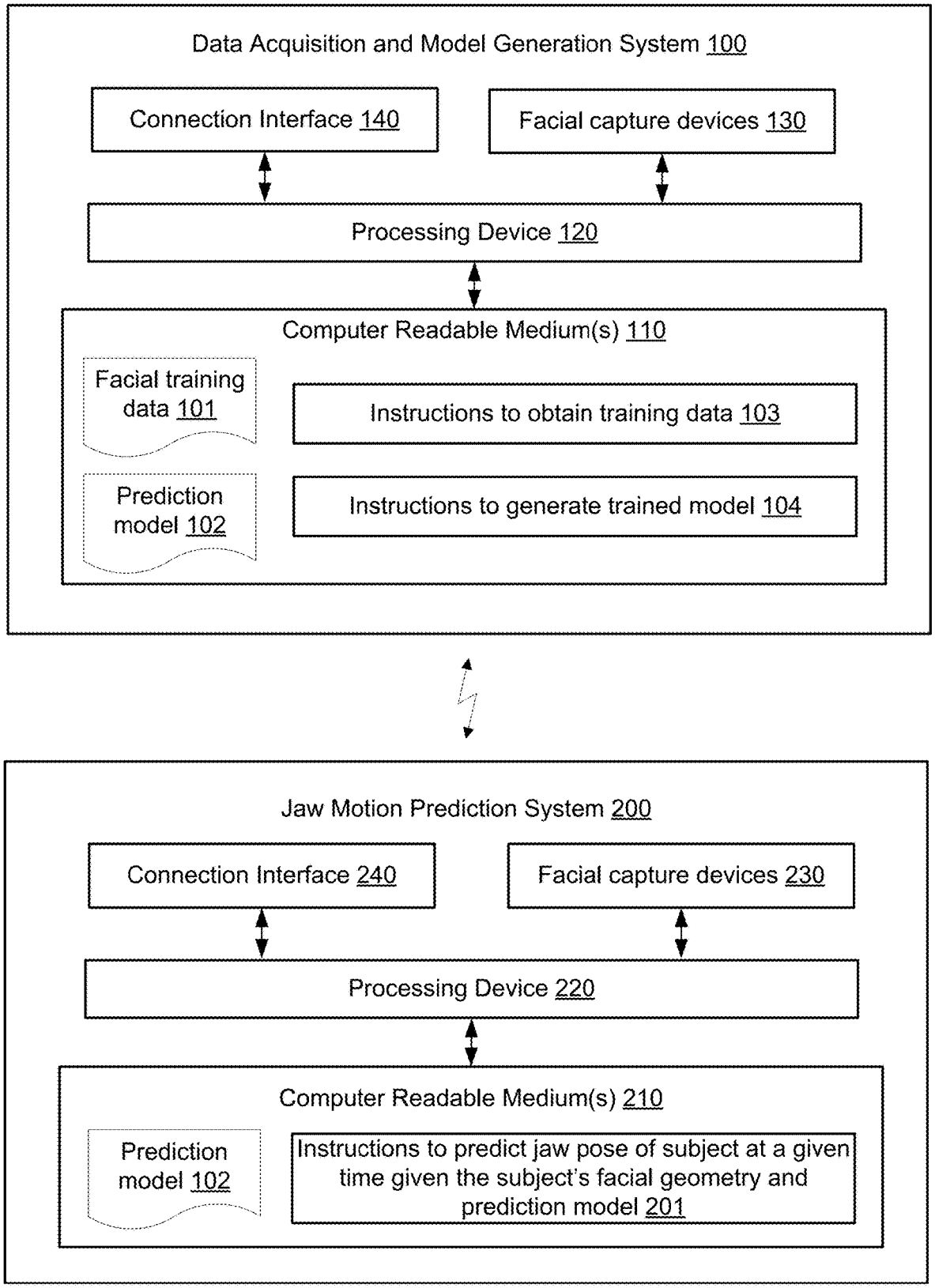
FIG. 1 illustrates an example environment in which the technology described herein may be implemented.

The figures are not exhaustive and do not limit the disclosure to the precise form disclosed.

DETAILED DESCRIPTION

Generating realistic facial animation may be an important aspect in the creation of digital characters for computer games, visual effects for film, and other virtual experiences. The underlying jaw may be an important aspect of the face, as the jaw's motion may be used to control the deformation of the face surface using methods like skinning. For this reason, many facial animation rigs contain an explicit jaw rig.

A significant amount of character facial animation is created through performance capture, in a process where a real actor is recorded and the facial surface is reconstructed and tracked to provide a digital performance that exactly matches the real one. The digital performance may then be provided to the animator as a starting point for further manipulation, which may involve a retargeting step to a fantasy creature or another human for final display. During this process, it may be important to know the jaw motion that corresponds to the captured facial performance of the actor.

Accurate jaw tracking has been studied in fields such as dentistry and speech analysis, however typically at the cost of complicated setups and invasive instruments such as electromagnetic sensors or fiducial markers attached to the teeth. In the computer graphics and visual effect communities, artists typically perform jaw tracking either fully manually (e.g., using markers attached to the teeth/jaw of the actor) or inaccurately by naively assuming skin motion around jaw line is equal to the jaw motion. The latter method neglects skin sliding, and produces inadequate results. Accordingly, there is a need for accurately tracking the jaw during facial performance capture or during facial motion capture without attaching markers or tracking teeth.

To this end, various implementations of the disclosure are directed to accurately tracking the jaw of a subject during facial performance capture without the need for attaching markers or tracking teeth. In accordance with implementations described herein, accurate jaw tracking for facial performances may be achieved using only the tracked facial surface as input. In such implementations, a non-linear mapping from skin motion to underlying jaw motion may be learned for one or more subjects for which a ground-truth jaw poses are obtained. As further described below, this mapping may be utilized for the same subjects for which the ground-truth jaw motion is obtained, or it may be transferred onto new subjects, for which ground truth jaw motion (e.g., marker based jaw tracking) is not available, rendering the techniques described herein applicable to traditional facial performance acquisition.

As noted above, in production, jaw tracking may be a very manual and labor intensive step, where artists leverage the teeth wherever visible and/or estimate the jaw pose from the perceived surface. Aside from the required effort, which may be very substantial, manual tracking offers a lot of potential for human error, which may manifest itself in the final character. As such, by virtue of implementing the techniques described herein, jaw tracking may be automated at a high accuracy while removing human error. Further, by virtue of implementing the techniques described herein, jaw tracking may achieve at a high accuracy without imposing any additional requirements onto the actor or the setup during acquisition. Moreover, the techniques described herein may be readily integrated with off-the-shelf facial performance capture systems.

These and other advantages that may be realized from implementing the systems and methods described may be further appreciated from the disclosure.

FIG. 1 illustrates an example environment in which the technology described herein may be implemented. FIG. 1 will be described in conjunction with FIG. 2, which is an operational flow diagram illustrating an example method 300 that may be implemented in this environment. As depicted, the environment includes a data acquisition and model generation system 100 and a jaw motion prediction system 200. Data acquisition and model generation system 100 is configured to perform operations 310-320 and jaw motion prediction system 200 is configured to perform operation 330.

During operation 310, data acquisition and model generation system 100 is configured to capture facial training data 101 for one or more subjects, the captured facial training data for each subject including the subject's facial skin geometry over a plurality of times (e.g., frames) and the subject's corresponding jaw poses for each of those plurality of times (e.g., for each frame). Particular implementations of operation 310 are further described below with reference to FIG. 3.

At operation 320, using the captured facial training data, system 100 is configured to train a prediction model 102 that provides a mapping from skin motion to jaw motion. Relevant features may be extracted from the facial training data 101 in preparation for training and learning the model. For example, set of skin features that define the skin motion and a set of jaw features that define the jaw motion may be extracted.

It should be appreciated that any suitable representation of skin motion and jaw motion may be used for the mapping. Skin motion may be encoded as absolute point locations, a displacement from a neutral position, blendshape weights, or some other suitable representation of skin motion. The jaw motion that the skin motion is mapped to may be encoded as absolute point locations, a displacement from a neutral position, distances to a skin surface, a transformation matrix, or some other suitable representation of jaw motion. As such, while some implementations of the disclosure will be described in the context of mapping skin vertex features to a set of displacements of jaw bone features, it should be appreciated that any suitable representations of skin motion and jaw motion may be used for the mapping. Particular implementations of operation 320 are further described below with reference to FIGS. 4-7.

In some implementations, depending on the accuracy of the prediction model (e.g., as determined from testing a subset of data 101), operations 310-320 may be iterated. For example, training data may be captured for additional subjects having a range of facial features and/or training data may be captured for the same subject over a greater range of facial expressions.

During operation 330, jaw motion prediction system 200 is configured to use the created model 102 to predict jaw poses for a subject over a plurality of times (e.g., frames) using an input the subject's corresponding facial skin geometry for those plurality of times (e.g., frames). The subject for which jaw poses are predicted using the learned model and input facial skin geometry may be one of the one or more subjects for which training data was acquired at operation 310. Alternatively, the subject may be a new subject in which case the mapping learned for the captured training subjects may be retargeted to the new target subject. Particular implementations of operation 330 are further described below with reference to FIGS. 7-9.

Data acquisition and model generation system 100 may include computer readable medium(s) 110, a processing device 120, facial capture devices 130, and connection interface 140. Facial capture devices 130 may be used at operation 310 to capture facial training data 101, including a subject's facial skin geometry over a plurality of times (e.g., frames) and a subject's corresponding jaw poses for each of those plurality of times (e.g., for each frame). One or more cameras, lights, facial markers, and/or teeth markers may be used to capture facial training data 101.

The computer readable medium(s) 110 may store facial training data 101 and a prediction model 102. Computer readable medium(s) 110 may additionally store instructions 103 that are executable by processing device 120 to obtain training data 101 (e.g., by performing operation 310 discussed above). Computer readable medium(s) 110 may additionally store instructions 104 that are executable by processing device 120 to generate prediction model 102 (e.g., by performing operation 320 discussed above).

Connection interface 140 may be to communicatively couple data acquisition and model generation system 100 to a connection interface 240 of jaw motion prediction system 200. For example, connection interface 140 may be to transmit a file including learned model 102 to jaw motion prediction system 200. In some implementations, connection interface 140 may be implemented as a wired interface (e.g., an HDMI interface, a USB interface such as a USB Type-C interface, a THUNDERBOLT interface, an Ethernet interface, etc.) In some implementations, connection interface 140 may be implemented as a wireless interface (e.g., a WiFi communications interface, a cellular communications interface, a satellite communications interface, etc.). In some implementations, connection interface 140 may comprise a combination of both wired and wireless interfaces.

Jaw motion prediction system 200 may include computer readable medium(s) 210, a processing device 210, facial capture devices 230, and connection interface 240. Facial capture devices 230 may be used at operation 330 to capture a subject's facial skin geometry over a plurality of times. For example, facial capture devices 230 may include one or more cameras and lights. Capture may occur during facial performance capture for media content creation. In some instances, facial capture devices 230 may also include facial markers, and/or teeth markers for capturing calibration poses to improve subject retargeting as further described below with reference to FIG. 7.

The computer readable medium(s) 210 may store a prediction model 102. Computer readable medium(s) 210 may additionally store instructions 201 that are executable by processing device 220 to predict a jaw pose of the subject for a given time (e.g., frame) or expression given the prediction model 201 and the subject's facial skin geometry at that time/expression (e.g., by performing operation 330 discussed above).

Connection interface 240 may be to communicatively couple jaw motion prediction system 200 to data acquisition and model generation system 100. For example, connection interface 240 may be to receive one or more files including learned model 102 from system 100.

Although the foregoing examples depict systems 100 and 200 as separate systems performing operations 310-330, in other implementations, systems 100 and 200 may be integrated into a single system that performs all of operations 310-330.

With particular reference now to capturing facial training data 101 for one or more subjects (e.g., operation 310), in order to learn a mapping from the skin surface to a jaw pose, ground truth data including both the skin surface and jaw pose may need to be captured at the same time. Training data 101 may be captured for a plurality of different subjects undergoing a large range of jaw motion. In this manner, a thoroughly captured dataset that spans a significant range of jaw and skin motion may be subsequently used to robustly train one or more predictors. In some implementations, the ground-truth data may be obtained as part of a one-time database creation step. In this manner, any system may subsequently use the data to learn mappings from skin motion to jaw motion and/or apply learned mappings. It should be appreciated that the number of subjects for which data is captured, along with the range of jaw motion of those subjects for which data is captured, may be tuned depending on the desired accuracy of the created model, further described below, and the diminishing returns in improved accuracy from capturing additional data.

Figure 3C:
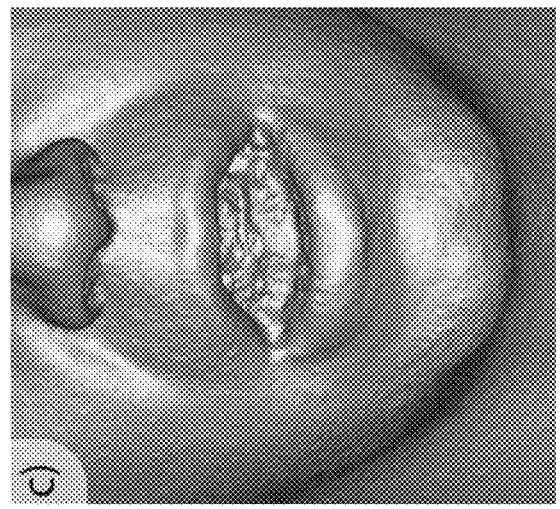
FIG. 3C depicts the image frame of FIG. 3B with a mask applied.
Figure 3B:
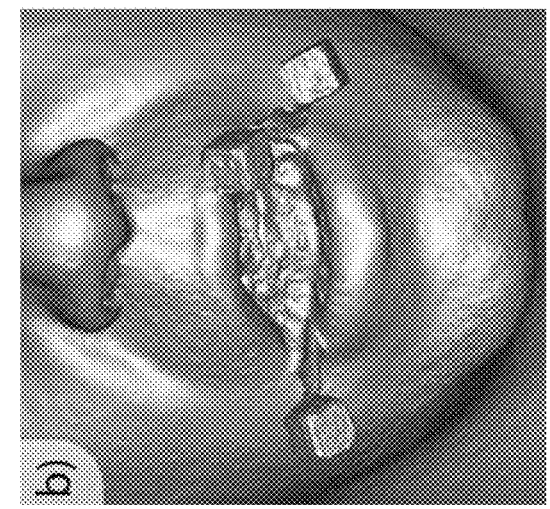
FIG. 3B depicts an example image frame without a mask applied to remove the marker from the reconstructed geometry.
Figure 3A:
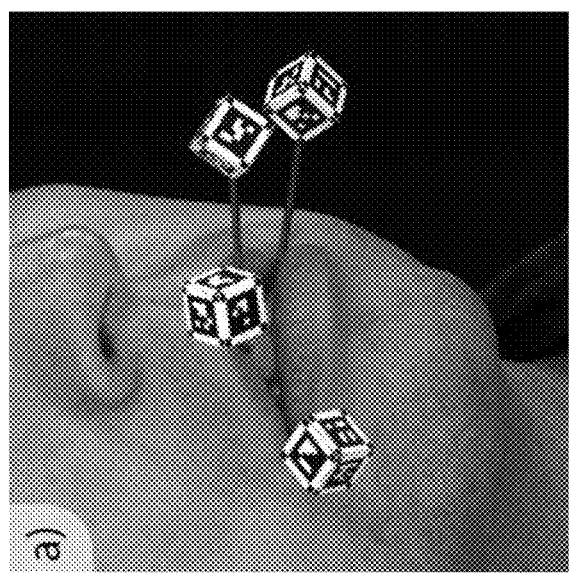
FIG. 3A illustrates markers glued to a subject's teeth.

For a given subject, skin geometry may be captured for each frame using facial capture devices 130 including a rig of one or more cameras and lights with software that may reconstruct a subject's face in full motion, without using motion-capture dots. Fiducial markers may be used to capture accurate jaw pose data per frame at the same time that the subject's skin geometry is captured. The fiducial markers may include a set of markers that are glued or otherwise attached to the subject's teeth, which may enable accurate estimation of the six degrees of freedom (DoF) pose of both the skull and jaw. This implementation is depicted by FIG. 3A, which illustrates markers glued to a subject's teeth. In implementations where fiducial markers are used to track jaw motion, in order to avoid artifacts caused by markers obstructing the subject's skin, markers may be automatically masked out from image frames to obtain more accurate reconstruction results for each frame. FIG. 3B depicts an example image frame without a mask applied to remove the marker from the reconstructed geometry. FIG. 3C depicts the image frame with the mask applied.

Although the above describes an example set of techniques for capturing facial training data 101, it should be appreciated that any suitable technique may be utilized to capture the facial skin geometry and corresponding jaw motion over time. For example, in some implementations an artist may manually label the subject's teeth as they appear in images. In another implementation, sensors (e.g., electromagnetic sensors) may be attached to a subject's teeth to precisely capture jaw motion. In yet further implementations, jaw motion may be recovered by detecting, using computer vision, some reflective material attached to the subject's teeth. In some implementations, motion-capture dots may be used to capture the subject's facial skin geometry over a plurality of times.

Following capture of the training data 101, including skin geometry and jaw pose, a relation between skin and jaw motion may be learned. To this end, relevant features may be extracted from the facial training data 101 in preparation for training and learning a prediction model that provides a mapping from skin motion to jaw motion. In accordance with implementations further discussed below, multiple skin points may be considered at the same time to predict each of several jaw points. By virtue of this implementation, a relationship between skin and jaw motion may be determined.

FIG. 4 is an operational flow diagram illustrating an example method 400 of extracting, from training data, skin features 460 and target displacements 470 of the jaw bone, in accordance with implementations of the disclosure. Operations 410-430 may be performed for the subject in the rest pose (e.g., neutral, no expression face). At operation 410, points or vertices may be selected on a surface of the jaw. For example, a set of a plurality of vertices on a mesh corresponding to the surface of the jaw may be sampled. The vertices may be randomly sampled and selected such that they are distributed over the surface of the jaw. In implementations, the only vertices that are sampled are within a mask that excludes vertices on the inside of the jaw.

At operation 420, for each selected point or vertex, a corresponding point on the face, is found and determines the corresponding skin feature vertex in the rest pose. In particular implementations, the corresponding point on the face is the closest point on the face along the normal of the jaw. For example, the selected vertices on the surface of the jaw may be projected in the direction of the jaw's normal to determine skin feature vertices in a neutral position.

Figure 5:
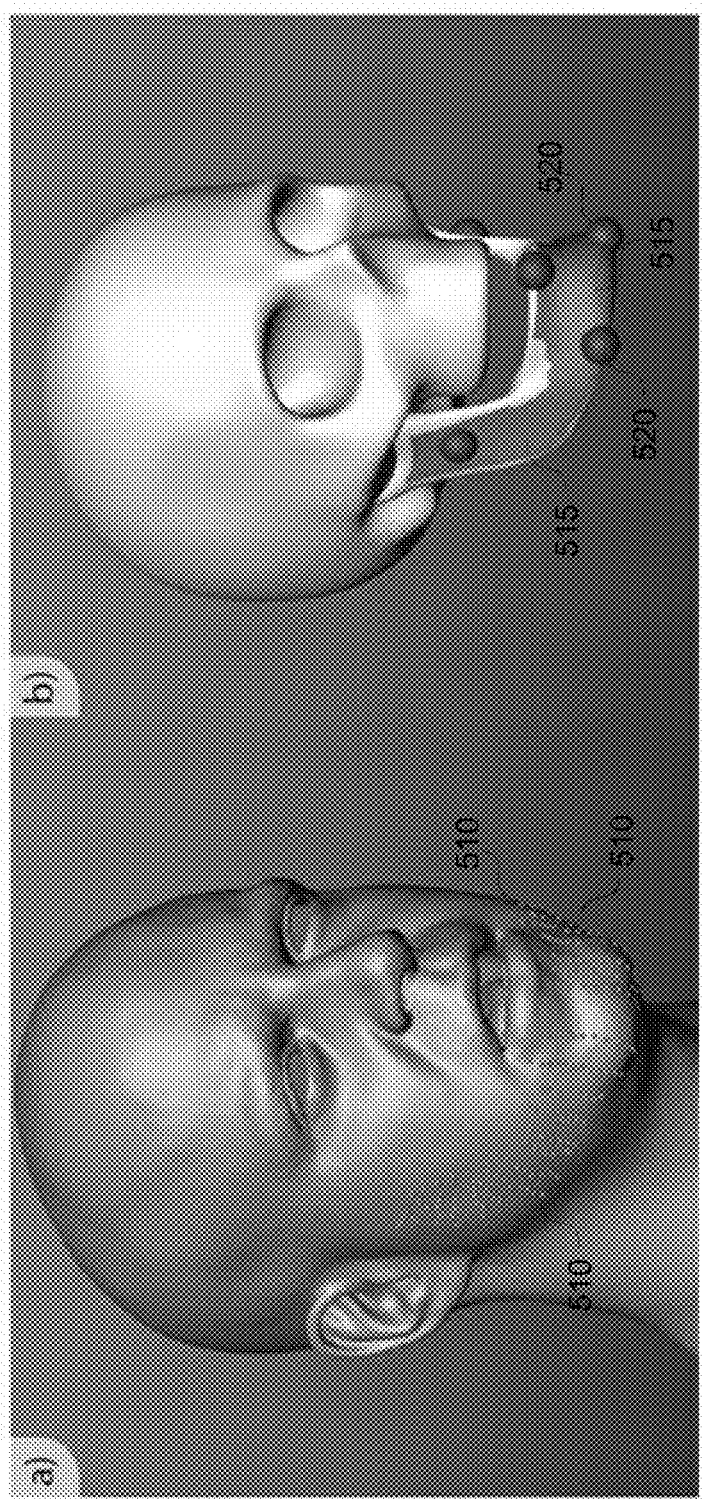
FIG. 5 depicts selection of a set of skin features vertices on a skin surface of the jaw and selection of points on the jaw as bone features, in accordance with implementations of the disclosure.

At operation 430, points on the jaw are selected in the rest pose. A set of points distributed over the jaw may be selected as jaw bone features. The selected jaw points may correspond to jaw bone features that are used to define the jaw pose as a rigid transformation. In implementations, a minimum of three non-collinear bone samples are used. FIG. 5 depicts one particular example implementation of operations 410-430. As illustrated in the example of FIG. 5, a set of 242 skin feature vertices 510 are selected on a skin surface by sampling vertices on the jaw within a manually painted mask 515 and computing the closest point on the skin along the jaw normals. As also depicted in the example of FIG. 5, five points 520 distributed over the jaw are selected as bone features.

At operation 440, for each training frame, the position of the skin feature vertices may be tracked to determine skin features 460 for all frames. The skin features vertices may be tracked relative to the subject's skull. For example, a displacement of the set of sample skin feature vertices from a reference neutral expression (i.e., rest pose) to another expression (i.e., in current training frame), relative to a coordinate frame of the skull, may be determined.

At operation 450, for each training frame, a displacement between a current position of the selected jaw points in the training frame's expression and the position of the selected jaw points in the rest pose may be tracked to determine target displacements 470 of the jaw.

Figure 6:
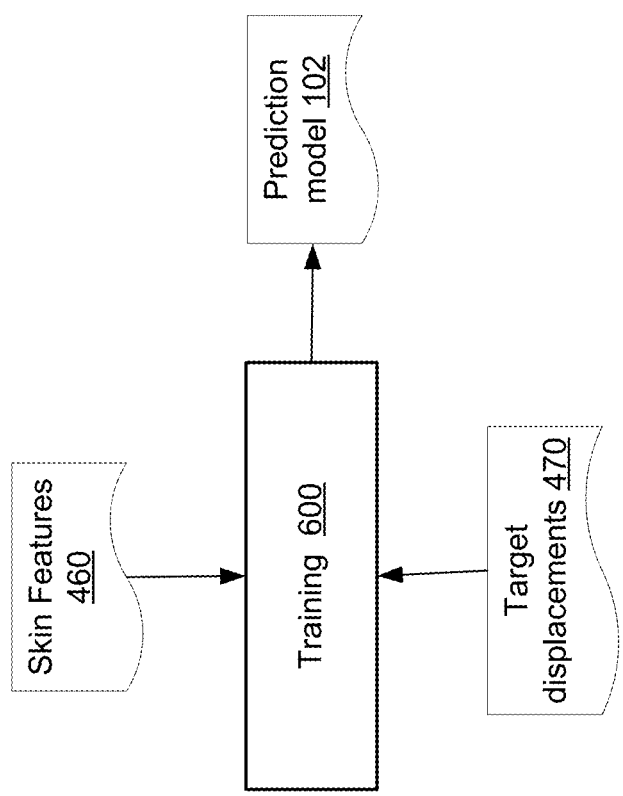
FIG. 6 illustrates training a prediction model to create a trained model that maps skin features to jaw target displacements, in accordance with implementations of the disclosure.

Following method 400, the determined set of skin features 460 and corresponding target displacements 470 of the jaw for each frame/expression may be used to train a model that provides a mapping for predicting a relative (e.g., from neutral) displacement of a set of points on the jaw given the skin surface features of the subject's face. This is depicted by FIG. 6, which illustrates a training 600 that is performed to create a prediction model 102 that maps from a set of skin features 460 to target displacements 470 of the jaw. This training 600 may be performed over all captured expressions in the training data. In implementations, training 600 may comprise a regression that is performed to regress from a set of skin features 460 to target displacements 470 of the jaw. A regressor may be trained for each jaw point to independently predict where each point of the jaw is moving to. Thereafter, the regressors may be aggregated to generate a final mapping that predicts jaw features from observed skin features. In particular implementations, a support vector machine (SVR) regressor may be trained for every jaw bone point to predict the displacement of the jaw point from skin displacements of all skin sample vertices. In other implementations, other regression methods such as a random forest regression, non-linear regression, or some other regression may used to regress from a set of skin features to displacements of the bone to train model 102.

The trained model 102 may be used to predict new jaw poses for a subject where ground-truth jaw poses have been acquired for a sufficient number of expressions. However, in some implementations, the ground truth poses may not be available. Although it may be assumed that the relation between skin and jaw motion generalizes across people given human anatomy, and that a mapping learned from one or more training subjects may be applied to new subjects, it may be advantageous to retarget a mapping learned from/on one or more training subjects to a new target subject. In accordance with such implementations, the retargeting method may be used to refine the mapping learned on one or more source subjects with respect to a new target subject. In particular, the retargeting method may be used to transform the motion space of each skin feature (e.g., each feature vertex) of the target subject to best align with the input space or feature space of the mapping that was computed from a source subject.

Figure 7:
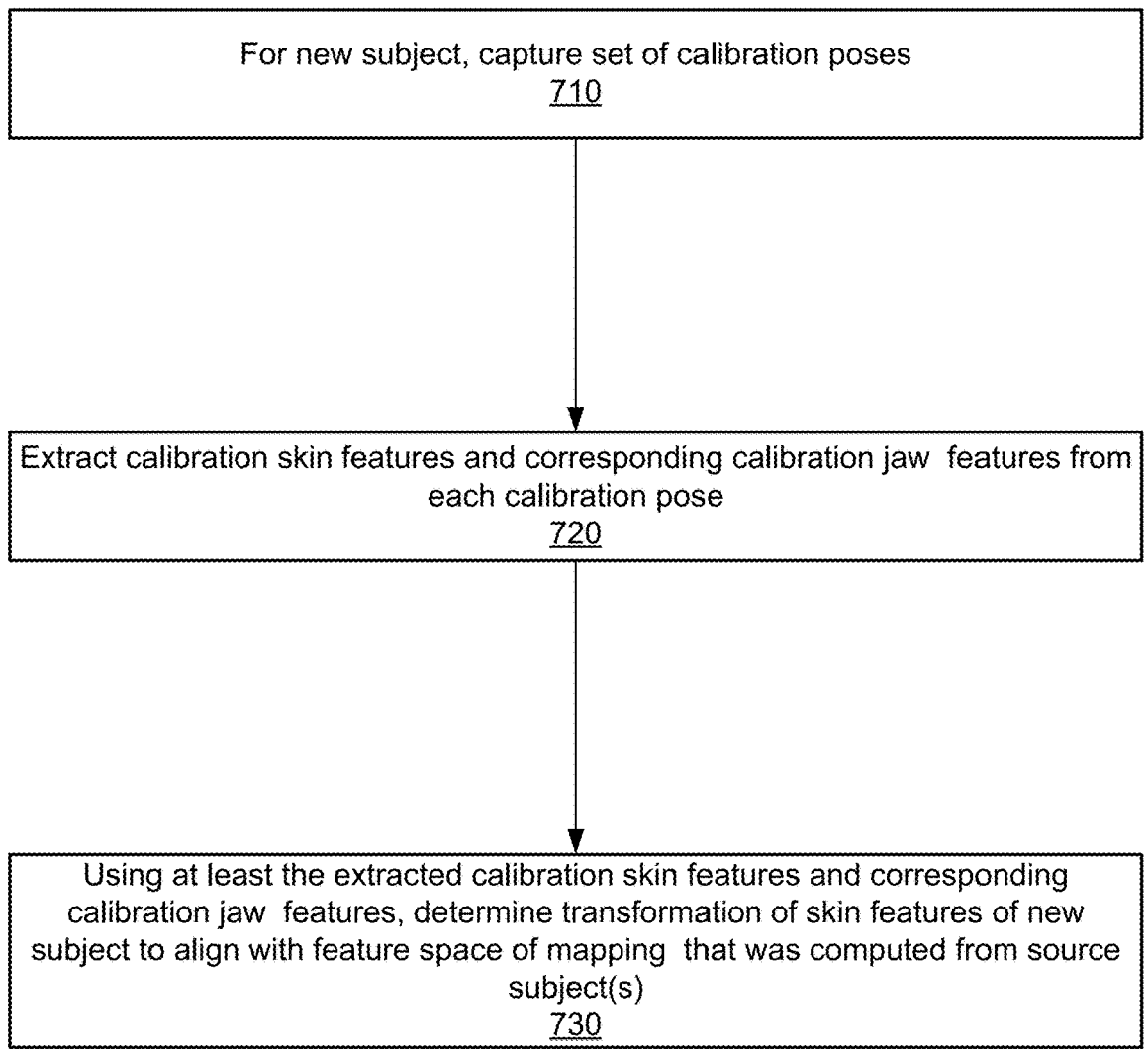
FIG. 7 is an operational flow diagram illustrating an example method of learning a retargeting for a new subject given a model trained on one or more other subjects, in accordance with implementations of the disclosure.

To this end, FIG. 7 is an operational flow diagram illustrating an example method 700 of learning a retargeting for a new subject given a model trained on one or more other subjects, in accordance with implementations of the disclosure. At operation 710, a set of calibration poses may be captured for a new subject. For example, a Multiview capture system without markers, or other suitable system may be used to capture the calibration poses. A small set of calibration poses may be captured for which lower teeth are visible and which show the extreme expressions of the new subject. For example, a set of five poses may be captured including, mouth wide open, jaw to the left, to the right, forward and backward. It should be appreciated that fewer or additional calibration poses may be captured depending on the implementation.

At operation 720, for each of the captured calibration poses, calibration skin features and corresponding calibration jaw features may be extracted. In implementations, calibration skin features and corresponding calibration bone features may be extracted from the new subject in a manner similar to how skin features and jaw features were extracted from training data as described above with reference to FIGS. 4-5.

At operation 730, using at least the extracted calibration skin features and corresponding calibration jaw features, a transformation of skin features of the new subject may be determined to align with the feature space of a mapping of skin motion to jaw motion that was computed from one or more source subjects. For example, the skin features of a target actor may be aligned with the ones from a source actor. In implementations, a transformation may be found for each of the skin features such that feature spaces of source and target subjects are optimally aligned, allowing use of the source mapping on unseen target input shapes after applying the transformations to the skin features.

Figure 8:
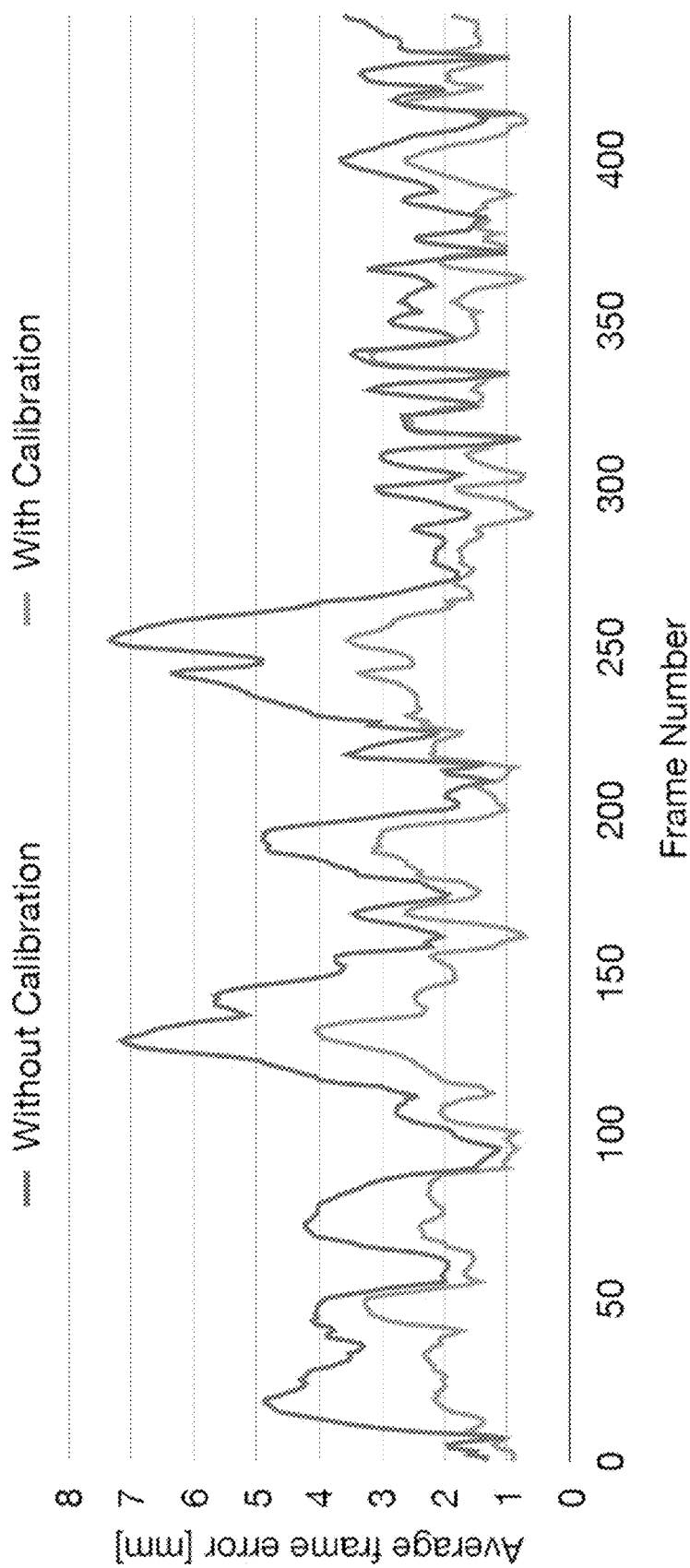
FIG. 8 is a chart showing comparison plots depicting one example of the effect of applying retargeting to one subject compared to no retargeting where the source subject mapping is used directly without transformations, in accordance with implementations of the disclosure.

FIG. 8 is a chart showing comparison plots depicting one example of the effect of applying retargeting to one subject compared to no retargeting where the source subject mapping is used directly without transformations, in accordance with implementations of the disclosure. In this example, the error for a given frame is computed from the average of all the vertices distances from the ground truth to the prediction. As shown, the aforementioned calibration procedure that aligns feature spaces of source and target subjects may lead to substantially lower prediction errors of jaw pose when retargeting is compared to uncalibrated retargeting. This was particularly observed for wider openings of the jaw.

In some cases, the retargeting method may be applied to align feature spaces of a single source subject with a target subject. In such cases, the retargeting method may produce good results in cases where the facial anatomy of the source and target subjects are similar. In some implementations, however, instead of retargeting the mapping from a single subject, it may be advantageous to combine the features of several subjects to learn a multi-subject mapping. In such cases, a number of different subject subjects having different facial structures and jaw motions may be captured (e.g., during the aforementioned steps for capturing facial training data 101).

To learn the multi-subject mapping, one of the source subjects may be selected as a primary subject, and a mapping may be learned for that subject as discussed above with reference to FIGS. 4-6. Thereafter, the mapping learned from the primary subject may be used to align the other subjects with the primary subjects following the calibration method described above with reference to FIG. 7, in this case solving for a single rigid transformation for all features globally. This may ensure that the skulls of the subjects are optimally aligned without destroying their relative differences, which may be the case if every feature was aligned separately. Once all the subjects are aligned with the primary subject, a single, combined, multi-subject mapping may be solved for, again following the techniques described above with reference to FIGS. 4-6, but this time using training data from all of the aligned subjects. This new mapping, trained on several subjects, may then be used when retargeting to unseen subjects following the calibration method described above with reference to FIG. 7. In some implementations of this multi-subject mapping method, it was empirically observed that it outperformed single-subject mapping overall, indicating that the regression succeeded at interpolating between subjects. The final result may be a jaw predictor trained from all captured subjects that can be retargeted to perform jaw tracking for any unseen target subject.

Figure 9:
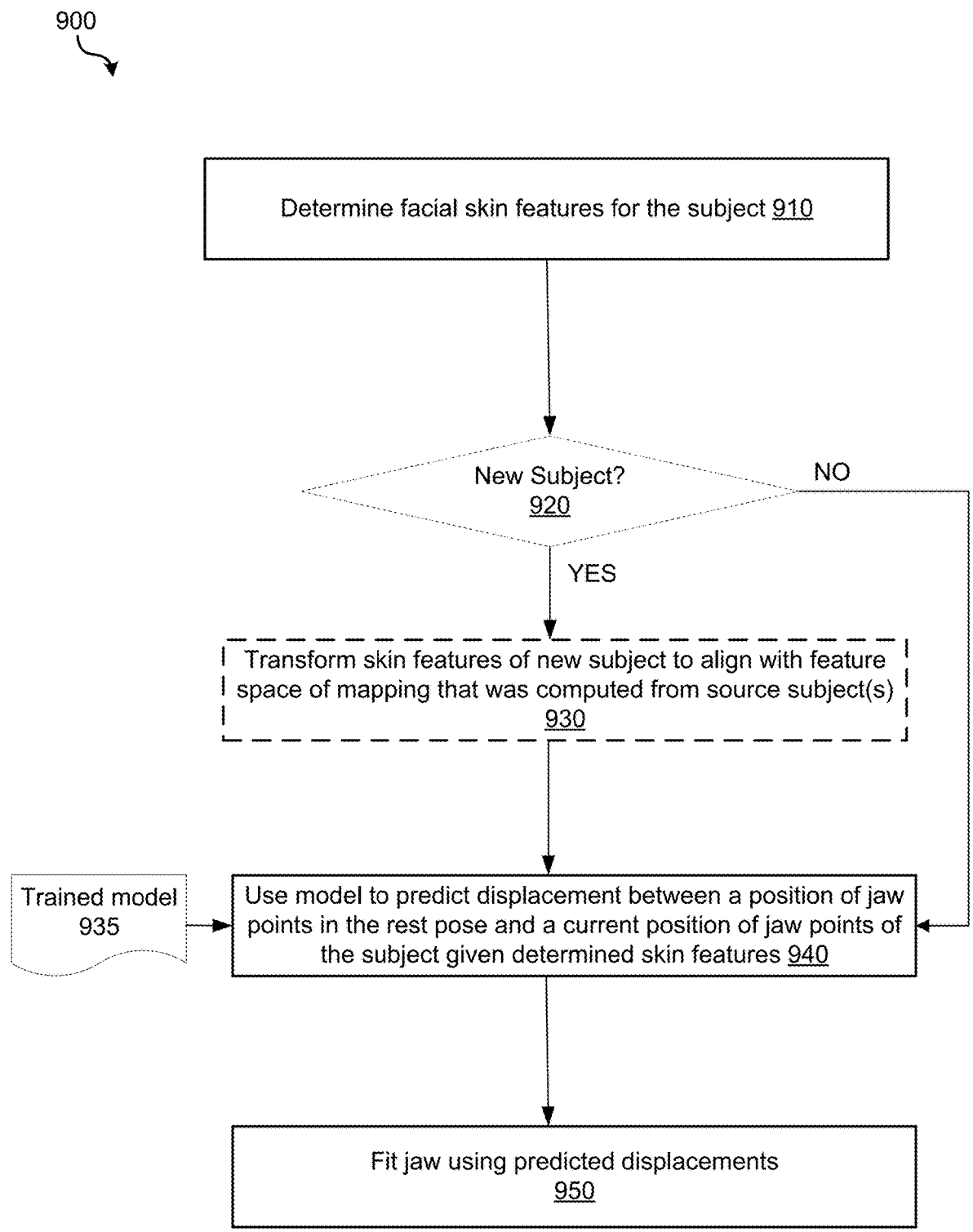
FIG. 9 is an operational flow diagram illustrating an example method of using a learned model to predict jaw poses for a subject for a given time or expression using as an input the subject's corresponding facial skin geometry for that time or expression, in accordance with implementations of the disclosure.

FIG. 9 is an operational flow diagram illustrating an example method 900 of using a learned model to predict a jaw pose for a subject for a given time (e.g., frame) or expression using as an input the subject's corresponding facial skin geometry for that time or expression, in accordance with implementations of the disclosure. It should be appreciated that method 900 may be repeated over a plurality of frames or expressions for the subject.

At operation 910, facial skin features are determined for the subject. For example, the position of the skin feature vertices relative to the skull may be determined from the facial skin geometry of the subject. If the subject is a new subject for which prior training data is not available (optional decision 920), at optional operation 930 the determined skin features may be transformed to align with a feature space of a mapping that was computed from one or more other source subjects. For example, skin feature vertices may be transformed as discussed above with reference to FIG. 7. Alternatively, regardless of whether the subject is a new subject, this transformation step may be skipped and the originally determined skin features may instead be used.

At operation 940, a prediction model 935 may be used to predict a displacement between a position of jaw points in the rest pose and a current position of jaw points of the subject given the skin features determined at 910 or transformed skin features determined at operation 930. The prediction model 935 may be obtained as discussed above with references to FIGS. 2-7. The prediction model may provide a mapping of skin motion to bone motion for a single subject or for multiple subjects. In implementations where a single subject mapping model is used, a model may be selected for a source subject having similar facial features as the target subject. In implementations where a model was already learned for the target subject, that same model may be used at operation 940.

At operation 950, the jaw of the target subject may be fitted using the predicted displacements, thereby determining a jaw pose.

It should be noted that although method 900 illustrates one particular example method of predicting a jaw pose for a subject given the subject's skin features and a model that provides a mapping from skin features to jaw feature displacements, the techniques described herein may more generally be applied to predict jaw poses using any model that provides a mapping from skin motion to jaw motion. For example, given the facial skin geometry of the subject as an input, a model that provides a mapping from skin motion to jaw motion may be used to predict the jaw motion of the subject. The predicted jaw motion of the subject may then be used to determine a jaw pose of the subject.

In particular implementations, a method for predicted jaw motion from observed skin motion may be mathematically formulated as follows. A mapping $\Phi(\mathcal{F}) \to \mathcal{B}$ that predicts jaw features $\mathcal{B}$ from observed skin features $\mathcal{F}$ may be found, and then the final jaw pose may be computed from the estimated jaw features.

Skin features $\mathcal{F}$. In order to render a feature space invariant to translation and global rotation of the head, a skin feature $\mathcal{F}_j \in \mathbb{R}^{|V| \times 3}$ may be defined to be the displacements $\{d_v\}_j$ of a set of sample vertices $v \in V$ from reference neutral to expression j, relative to the coordinate frame of the skull. The feature vertices V on the face may be computed by randomly sampling jaw vertices and finding the closest point on the face along the normal of the jaw. Only jaw points within a manually defined mask may be sampled, which excludes vertices on the inside of the jaw. For example, as depicted by FIG. 5, 242 skin feature vertices 510 over the chin area of the face may be sampled, hence $\mathcal{F}_j \in \mathbb{R}^{242 \times 3}$.

Bone features $\mathcal{B}$. Target bone features $\mathcal{B}_j \in \mathbb{R}^{|W| \times 3}$ that are invariant to translation and global rotation may be found and expressed as displacements $\{b_w\}_j$ of a set of sample vertices $w \in \mathcal{W}$ from the reference bone pose to the pose in expression j, relative to the coordinate frame of the skull. Since these features may be used to define the jaw pose as a rigid transformation, a minimum of three non-collinear bone samples may be required, and more samples can increase robustness to noise. It was found empirically that five samples, selected manually as shown in FIG. 5 as spheres 520, produce compelling results while keeping the feature space compact, yielding $\mathcal{B}_j \in \mathbb{R}^{5 \times 3}$.

For every bone sample w a support vector machine (SVR) regressor $\phi_w(\{d_v\}) \to b_w$ may be trained that predicts the displacement $b_w$ for the bone sample w from the skin displacements $\{d_v\}$ of all skin sample vertices $v \in V$, trained over all captured expressions j in the training data. In some implementations, three different regressors per bone target, one for each dimension, may be trained. In such implementations, the final mapping $\Phi(\mathcal{F}) \to \mathcal{B}$ may be given by aggregating the regressors $\phi_w$ for the individual jaw bone samples w.

For any new expression k of the face, the skin feature $\mathcal{F}_k$ may be computed and the regression may be evaluated to obtain a corresponding bone feature $\mathcal{B}_k$. From these predicted displacements $\{b_w\}_k$ for the jaw bone samples w, absolute locations $\{x_w\}_k$ may be computed, and we may solve for the rigid transformation $T_k$ that optimally fits the jaw bone to these locations in a least-squares sense, by minimizing Equation (1):

$$E_{fit}(T) = \Sigma_{w \in W} \|T\hat{x}_w - x_w\|_2^2 \qquad (1)$$

Where $\hat{x}_w$ denotes the location of bone feature w in the reference pose, and note that the pose subscript k was removed for simplicity. $E_{fit}$ may be minimized using the ceres solver.

In particular implementations, a method for retargeting from source subject(s) to a new subject may be formulated as follows. A small set of calibration poses $\mathcal{P}$ may be captured for which lower teeth are visible. This set may include five poses: mouth wide open, jaw to the left, to the right, forward, and backward. Thereafter, the skull may be aligned to these poses and used to recover the rigid transformation of the jaw with respect to the skull for each frame by triangulating teeth outlines on images. For each calibration pose $p \in \mathcal{P}$, calibration skin features $\mathcal{F}_p$ and corresponding calibration bone features $\mathcal{B}_p$ may be extracted. The retargeting method may assume consistent vertex topology such that the skin features $\mathcal{F}_p$ are consistent across actors.

The motion space of each feature vertex v on the target subject may be transformed to best align with the mapping $\Phi$ that was computed from a source subject. To this end, the following may be formulated in accordance with Equation (2): an energy term for solving the optimal rigid transformations $R_v$ for every skin feature v, defined over all poses p of the calibration set $$E_{ret}(\{R_v\}) = \Sigma_{p \in \mathcal{P}} \|\Phi(\{R_v\} \otimes \mathcal{F}_p) - \mathcal{B}_p\|_2^2 \qquad (2)$$

Define $\{R_v\} \otimes \mathcal{F}_p$ as the operator applying each transformation $R_v$ to the corresponding displacement $d_v \in \mathcal{F}_p$. Additionally add regularization terms for both the translational $(t_v)$ and rotational $(q_v)$ components of each transformation $R_v = T(q_v, t_v)$. The optimal rigid transformations may then be computed by solving $$\min_{\{q_v, t_p\}} E_{ret}(\{T(q_v, t_v)\}) + \lambda_1 \sum_{q_v} \|q_0 \cdot q_v^{-1}\|_2^2 + \lambda_2 \sum_{t_v} \|t_v\|_2^2 \qquad (3)$$

With $q_0$ being the identity quaternion. Equation (3) may be minimized using ceres, with $\lambda_1 = 1e-5$, and $\lambda_2 = 2.5e-5$. This may optimally align the feature spaces of source and target subjects, allowing to use the source mapping on unseen target input shapes after applying the transformations $\{R_v\}$ to the skin features.

It should be noted that although implementations of the disclosure have been described primarily in the context of jaw tracking for the purpose of facial performance capture to create media content (e.g., films, episodes, video games, augmented reality or virtual reality content, etc.), the technology described herein may be applicable to other fields (e.g., dentistry and speech analysis) where accurate facial movement capture is desirable, particularly without the need for complicated or invasive methods.

Experimental Results

Implementations of the jaw tracking method described herein were evaluated, including validating the case of training and testing on the same subject, validating retargeting a trained model from a corpus of subjects to an unseen subject, and demonstrating additional examples of unseen subjects qualitatively. During validation, comparisons were made to baseline result. As a baseline, a computation was made of the rigid transformation from the neutral pose to the input expression using Procrustes analysis on the skin feature vertices, and this transformation was applied to the jaw bone. Although this baseline algorithm may typically predict the general direction of jaw motion correction, it may fail to achieve high accuracy because it does not capture the effects of skin sliding over the bone, as further demonstrated below.

Figure 10:
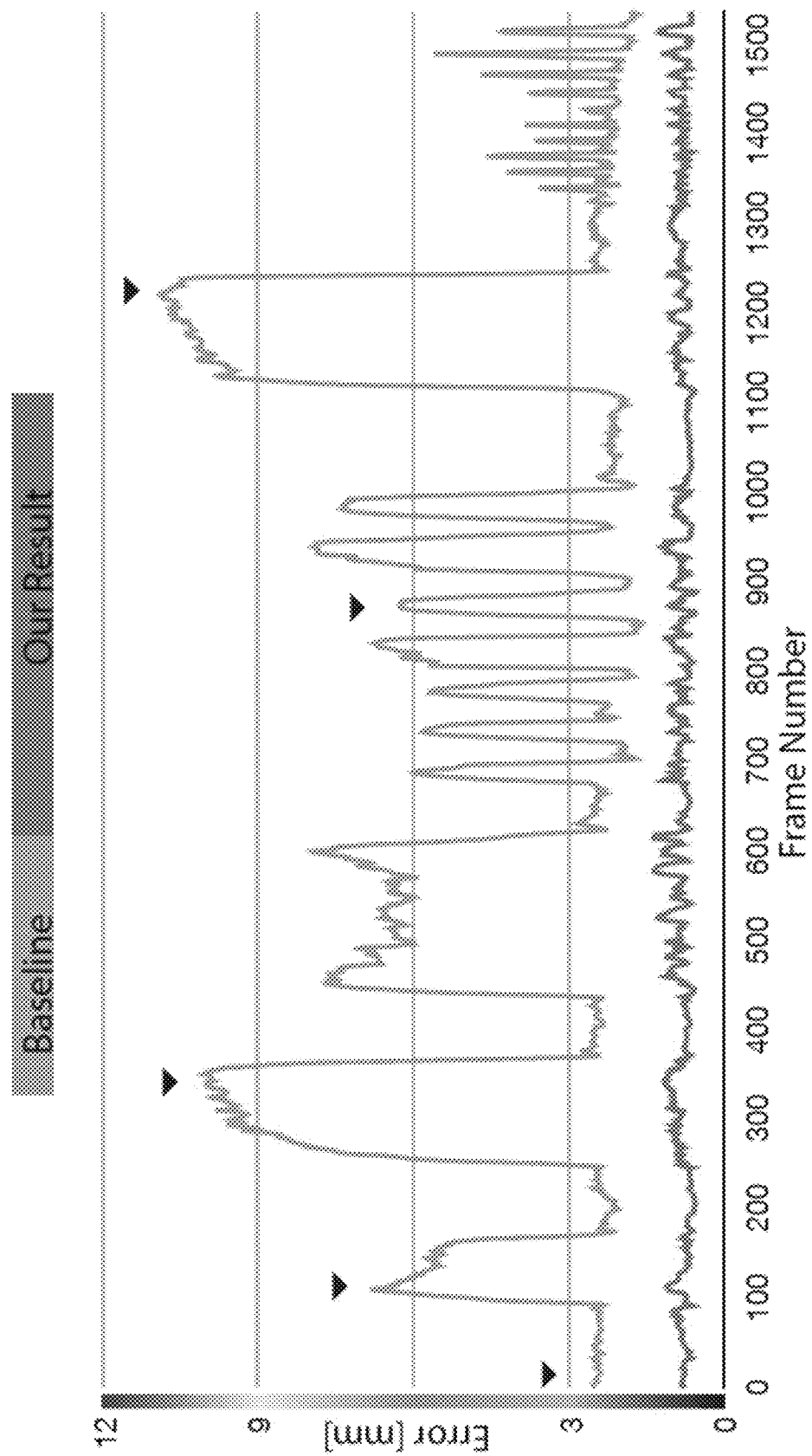
FIG. 10 is a chart showing comparison plots depicting a comparison of a baseline method that assumes skin motion around the jaw line is equal to the jaw motion with an implementation of the disclosure described herein for the application of training on one subject, and testing on new expressions of the same subject.

Implementations of the jaw tracking method described herein were tested by validating the application of training on one subject, and testing on new expressions of the same subject. FIG. 10 is a chart including comparison plots depicting this validation, where 3539 frames of various jaw motions from a subject were captured using fiducial markers to obtain ground truth jaw poses. A predictor as described herein was trained on the first 2000 frames, and then tested on the remaining 1539 frames. In this example, the error for a given frame is computed from the average of all the vertices distances from the ground truth to the prediction. As demonstrated by FIG. 10, implementations of the method described herein (bottom curve) greatly improved over the baseline approach (top curve), and maintained a consistently low error despite the variety of jaw poses. Implementations of the method described herein had a consistently low error, below 1 mm, whereas the baseline method in some instances exceeded 10 mm.

Implementations of the method described herein were tested by validating the retargeting of a trained predictor from several subjects to a new unseen subject. Four main subjects ($S_1$, $S_2$, $S_3$, $S_4$) for which significant ground truth data was available were considered, and a leave-on-out cross validation was performed. For example, a predictor was trained on three of the subjects (e.g., $S_1$, $S_2$, $S_3$) and then tested on one subject (e.g., $S_4$), comparing again to the aforementioned baseline approach. The results of all combinations are shown in the first four columns of Table 1 below, which shows the average prediction error in mm of both the proposed and the baseline method.

TABLE 1

|  | $S_1$ | $S_2$ | $S_3$ | $S_4$ | $S_5$ |
|---|---|---|---|---|---|
| Baseline | 5.20 | 4.97 | 4.79 | 9.97 | 5.89 |
| Example Implementation | 2.38 | 1.09 | 1.32 | 1.50 | 1.52 |

As depicted, implementations of the method described herein outperformed the baseline for every subject (subject $S_5$ was not used for training and is predicted using $S_1$-$S_4$). Thereafter, a single multi-subject predictor was creating using all frames of the four subjects, and tested on an additional subject $S_5$, shown in column 5 of Table 1. As shown, in all cases, implementations of the retargeting method described herein quantitatively outperformed the baseline method by a wide margin.

Figure 11:
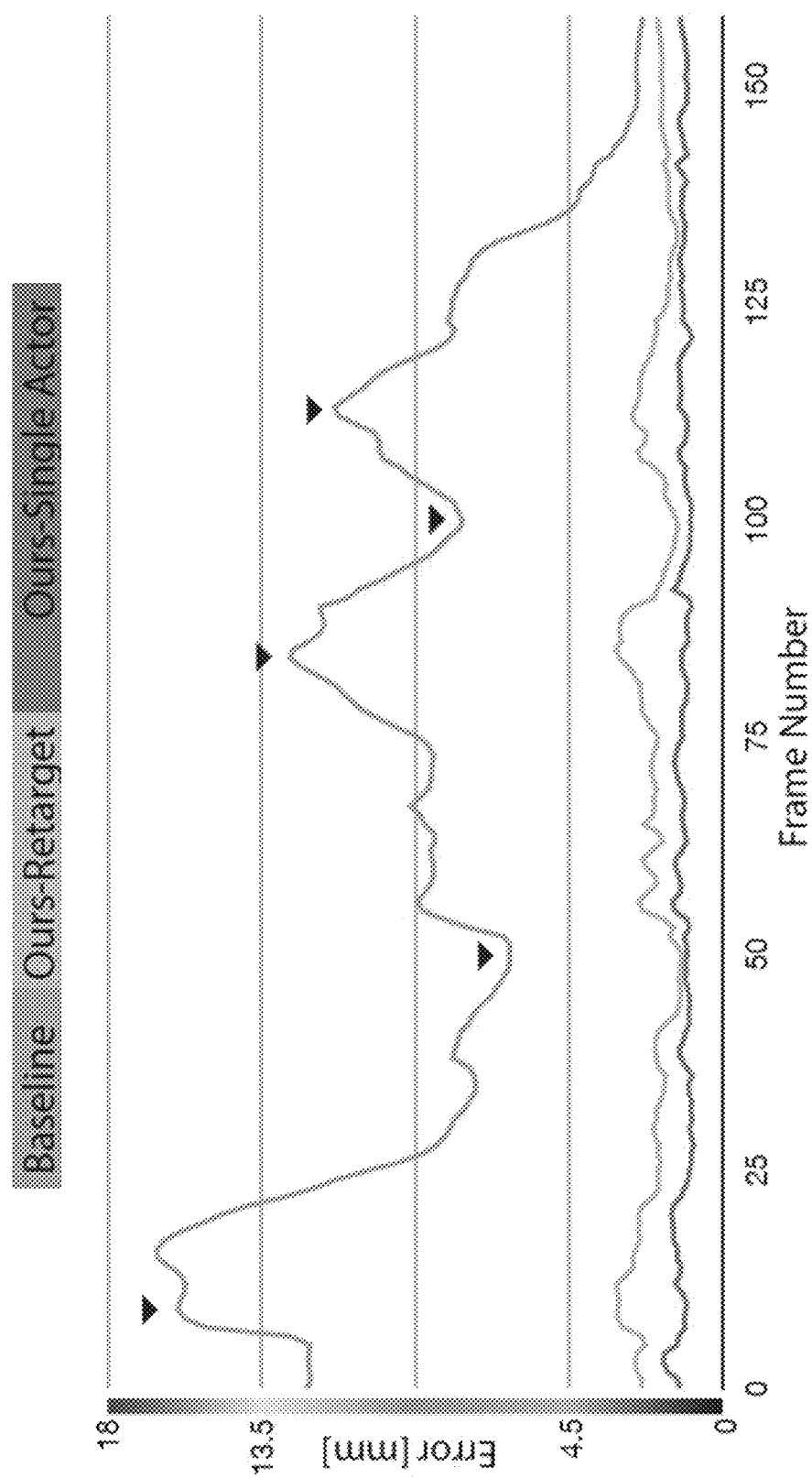
FIG. 11 is a chart including comparison plots depicting an implementation of the multi-subject retargeting method described herein as compared to a baseline method that assumes skin motion around the jaw line is equal to the jaw motion.

FIG. 11 is a chart including comparison plots depicting an implementation of the multi-subject retargeting method described herein as compared to the baseline as well as the single subject training learned on ground truth of the same subject. For this example, the target subject is $S_4$, corresponding to the fourth column of Table 1. The single subject predictor was trained on 800 frames of jaw motion, and then both the single and retargeted predictors were tested on a sequence of 159 frames. In this example, the error for a given frame is computed from the average of all the vertices distances from the ground truth to the prediction. As shown by FIG. 11, the retargeting results (middle curve) are very similar in accuracy and consistent with respect to the single subject training (bottom curve), indicating that the retargeting method works well, and that implementations of the method described herein are highly applicable to subjects for which ground truth data is not available. Additionally, both single subject and retargeting results greatly outperformed the baseline (top curve).

Figure 12:
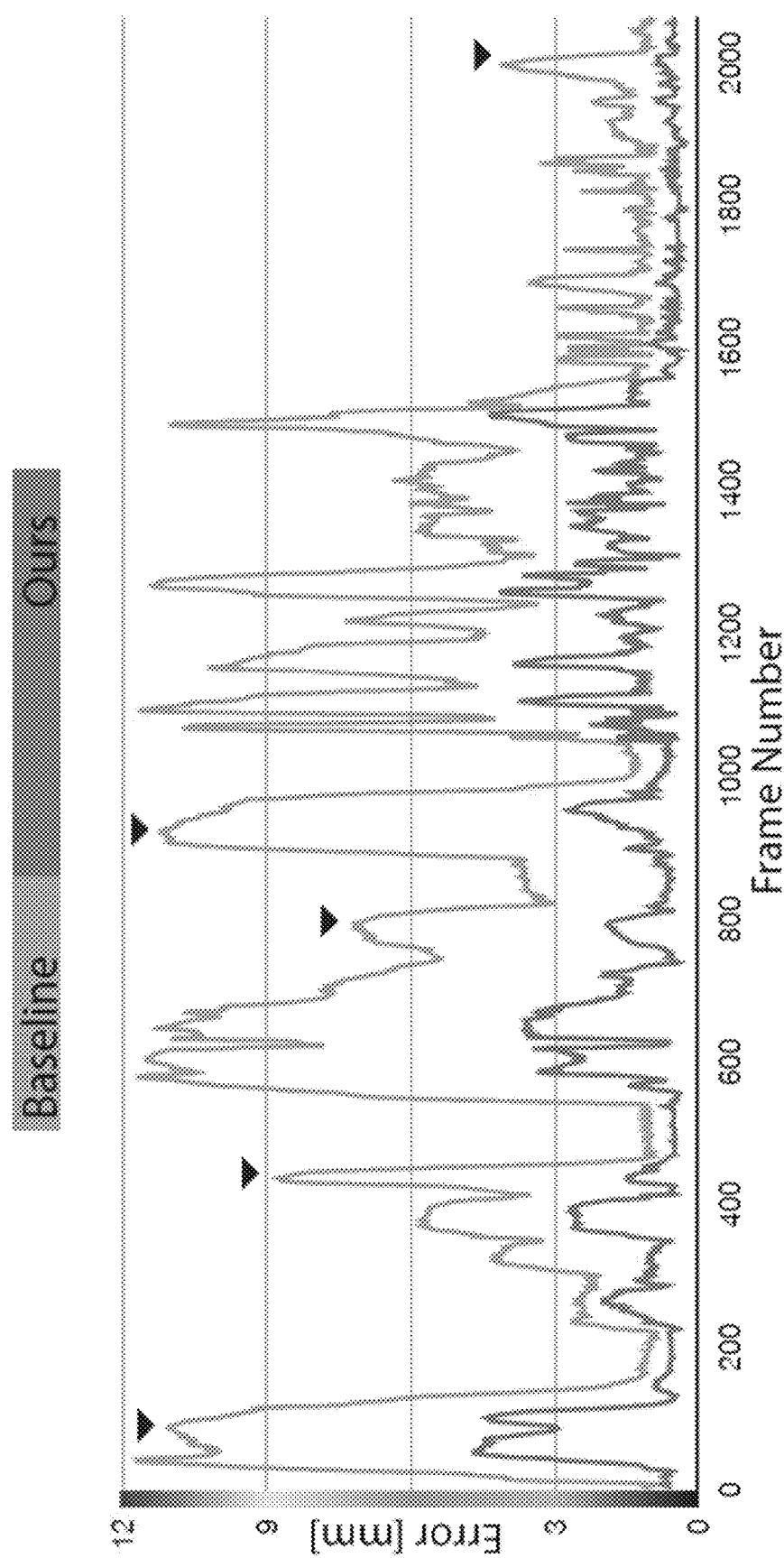
FIG. 12 is a chart including comparison plots depicting an implementation of the multi-subject retargeting method described herein as compared to a baseline method that assumes skin motion around the jaw line is equal to the jaw motion.

FIG. 12 is a chart including comparison plots showing another visualization of the retargeting validation, this time for subject $S_3$ corresponding to column three of Table 1. In this example, the error for a given frame is computed from the average of all the vertices distances from the ground truth to the prediction. As shown, implementations of the method described herein, bottom curve, consistently outperformed the baseline approach (top curve).

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard,"

"known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored thereon that, when executed by a processor, cause a system to perform operations comprising:
    capturing facial training data for one or more subjects, the captured facial training data including each subject's facial skin geometry and corresponding jaw pose tracked over a plurality of times; and
    creating, using the captured facial training data, a model that predicts, based on multiple spatially distributed facial skin features that define a skin motion, multiple jaw features that define a jaw motion corresponding to the skin motion, wherein creating the model comprises:
        selecting points on a jaw of a first subject of the one or more subjects while the first subject is in a rest pose;
        for each of the selected points, finding a corresponding point on a face of the first subject to determine skin feature points in the rest pose; and
        for each of a plurality of frames:
            tracking a position of the skin feature points to derive skin features; and
            tracking a displacement between a current position of the selected points on the first subject's jaw and a position of the selected points on the first subject's jaw in the rest pose to derive target jaw displacements.

2. The non-transitory computer-readable of claim 1, wherein the multiple jaw features are displacements of jaw points distributed over a surface of a jaw.

3. The non-transitory computer-readable medium of claim 1, wherein:
    the one or more subjects include a plurality of subjects; and
    the facial training data is captured for the plurality of subjects over a plurality of facial expressions.

4. The non-transitory computer-readable of claim 1, wherein creating the model comprises: training a regression from the multiple skin features to the multiple jaw features.

5. The non-transitory computer-readable medium of claim 4, wherein training the regression comprises training a regressor for each of the selected points on the first subject's jaw to independently predict a displacement of each of the selected points of the first subject's jaw.

6. The non-transitory computer-readable medium of 1, wherein the operations further comprise: predicting, using the model, a jaw pose of a first subject for a first time using as an input a first facial skin geometry of the first subject for the first time.

7. The non-transitory computer-readable medium of claim 6, wherein the first subject for which the jaw pose is predicted is one of the one or more subjects for which the facial training data is captured.

8. The non-transitory computer-readable medium of claim 6, wherein predicting, using the model, the jaw pose of the first subject for the first time comprises:
    determining skin motion relative to a skull of the first subject;
    predicting, using the model, jaw motion of the first subject; and
    predicting, using the jaw motion of the first subject that is predicted, the first subject's jaw pose.

9. A method, comprising:
    capturing facial training data for one or more subjects, the captured facial training data including each subject's facial skin geometry and corresponding jaw pose tracked over a plurality of times; and
    creating, using the captured facial training, a model that predicts, based on multiple spatially distributed facial skin features that define a skin motion, multiple jaw features that define a jaw motion corresponding to the skin motion, wherein creating the model comprises:
        selecting points on a jaw of a first subject of the one or more subjects while the first subject is in a rest pose;
        for each of the selected points, finding a corresponding point on a face of the first subject to determine skin feature points in the rest pose; and
        for each of a plurality of frames:
            tracking a position of the skin feature points to derive skin features; and
            tracking a displacement between a current position of the selected points on the first subject's jaw and a position of the selected points on the first subject's jaw in the rest pose to derive target jaw displacements.

10. The method of claim 9, wherein creating the model comprises: training a regression from the multiple skin features to the multiple jaw features.

11. The method of claim 9, further comprising: predicting, using the model, a jaw pose of a first subject for a first time using as an input a first facial skin geometry of the first subject for the first time.

12. The method of claim 11, wherein the first subject for which the jaw pose is predicted is different from the one or more subjects for which the facial training data is captured.

13. A non-transitory computer-readable medium having executable instructions stored thereon that, when executed by a processor, cause a system to perform operations comprising:
    capturing facial training data for a plurality of subjects, the captured facial training data including each subject's facial skin geometry and corresponding jaw pose tracked over a plurality of times; and
    creating, using the captured facial training data, a model that predicts, based on multiple spatially distributed facial skin features that define a skin motion, multiple jaw features that define a jaw motion corresponding to the skin motion, wherein creating the model comprises:
        learning, for a first subject of the plurality of subjects, using the first subject's facial skin geometry and corresponding jaw pose tracked over the plurality of times, a first mapping from a set of skin features to a set of jaw features;
        aligning, using the first mapping, the facial skin geometry of another subject of the plurality of subjects with the facial skin geometry of the first subject; and
        learning, using the first subject's facial skin geometry, the other subject's aligned facial skin geometry, and each subject's corresponding jaw pose tracked over the plurality of times, a second mapping from a set of skin features to a set of jaw features.

14. A non-transitory computer-readable medium having executable instructions stored thereon that, when executed by a processor, cause a system to perform operations comprising:
- capturing facial training data for one or more subjects, the captured facial training data including each subject's facial skin geometry and corresponding jaw pose tracked over a plurality of times;
- creating, using the captured facial training data, a model that provides a mapping from skin motion to jaw motion; and
- predicting, using the model, a jaw pose of a first subject for a first time using as an input a first facial skin geometry of the first subject for the first time, the first subject being different from the one or more subjects for which the facial training data is captured.

15. The non-transitory computer-readable medium of 14, wherein the operations further comprise:
- capturing a plurality of calibration poses for the first subject;
- extracting calibration skin features and corresponding calibration bone features from each of the plurality of captured calibration poses; and
- determining, using at least the extracted calibration skin features and corresponding calibration bone features, a transformation of skin features of the first subject to align with a feature space of the model.

16. A non-transitory computer-readable medium having executable instructions stored thereon that, when executed by a processor, cause a system to perform operations comprising:
- determining a facial skin geometry of a subject;
- extracting skin features from the facial skin geometry of the subject;
- transforming the skin features to align with a feature space of a model, wherein the model is created using facial skin features of another subject;
- after transforming the skin features, predicting, using the model, a motion of the subject's jaw from a rest pose given the facial skin geometry; and
- determining, based on the motion of the subject's jaw from the rest pose, a jaw pose of the subject.

17. The non-transitory computer-readable medium of claim 16, wherein the model is configured to predict, based on multiple skin features that define a skin motion, multiple jaw features that define a jaw motion corresponding to the skin motion.

18. The non-transitory computer-readable of claim 17, wherein:
- the multiple jaw features are displacements of jaw points,
- predicting, using the model, the motion of the subject's jaw from the rest post comprises: predicting displacements between current positions of points on the subject's jaw and a position of points of the subject's jaw in the rest pose given a position of the skin features of the subject, and
- determining the jaw pose of the subject comprises fitting the subject's jaw using the predicted displacements.

* * * * *